Figure 1:
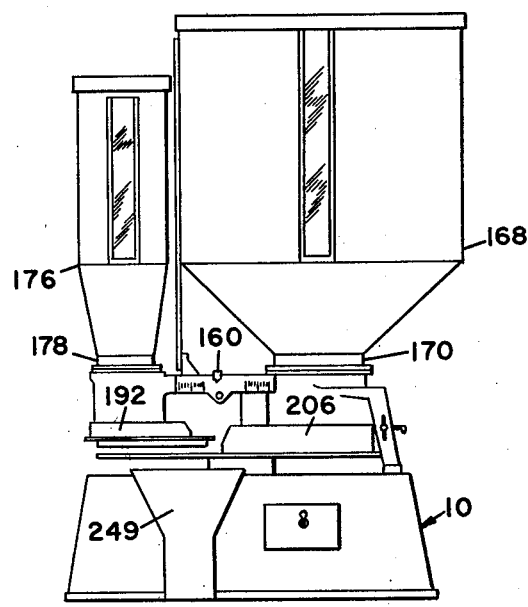

July 21, 1964  N. BREWER  3,141,575
APPARATUS FOR BLENDING MATERIALS
Filed Aug. 8, 1962  6 Sheets-Sheet 1

INVENTOR.
NATHANIEL BREWER
BY
Busser, Smith & Harding
ATTORNEYS

July 21, 1964

N. BREWER 3,141,575

APPARATUS FOR BLENDING MATERIALS

Filed Aug. 8, 1962

6 Sheets-Sheet 2

INVENTOR.
NATHANIEL BREWER
BY
Busser, Smith & Harding
ATTORNEYS

INVENTOR.
NATHANIEL BREWER

INVENTOR.
NATHANIEL BREWER

United States Patent Office

3,141,575
Patented July 21, 1964

3,141,575
APPARATUS FOR BLENDING MATERIALS
Nathaniel Brewer, Newtown, Pa., assignor to Wilson Products, Inc., Meshanic, N.J., a corporation of New Jersey
Filed Aug. 8, 1962, Ser. No. 215,612
12 Claims. (Cl. 222—132)

This invention relates generally to apparatus for blending free flowing solid materials.

It is, for example, useful for proportioning solid color concentrates to uncolored resins being fed to the hoppers of extruders and for purposes of illustration its use in this connection will be described.

Heretofore, in blending color concentrates with uncolored compounds being fed to the hoppers of extruders, it has been the general practice to tumble the color concentrates into the uncolored compounds prior to feeding it to the extruder, the process being a batch process. This practice has not proved to be entirely satisfactory because tumbling equipment is expensive, requires considerable floor space and labor costs are high because the tumbled compound must be transported to the extruder. In addition, while transporting the drums into which the color concentrate has been tumbled, the color concentrate tends to separate from the compound, in consequence of which the color of the product is not uniform. Furthermore, since the compound and color concentrate are tumbled in batches, a batch is always at least a little in excess of what is required for a given run, and what is left over is wasted. Accordingly, an important object of the present invention is to provide apparatus which continuously blends the materials and feeds them in a steady stream to the extruder hopper progressively as needed without waste.

In many plastic molding processes it is desirable to use as the raw material a resin which consists of a mixture of two stocks. For example, in the molding of polystyrene, in order to produce a polystyrene which has a high impact resistance it is necessary to combine with the inexpensive, but brittle basic resin an expensive high impact resistant material. Moreover, various types of articles made from polystyrene should have various degrees of impact resistance. Accordingly, it is desirable to vary the proportion of the high impact to the low impact materials. Also, it is desirable to add enough color concentrate to the stock to color the entire mixture.

Also, in many molding processes there is a substantial amount of material which must be trimmed from the article produced and there are a number of rejected articles. This scrap material is granulated to reduce it to a small particle size satisfactory for reworking. Generally, the scrap material is mixed with virgin material when it is reworked. It is important to provide the proper proportion of scrap to new stock in order to obtain a satisfactory finished product. Also, it is necessary to proportion the color concentrate accurately according to the amount of virgin, uncolored resin that is being used.

Accordingly, another object of the present invention is to provide an apparatus for continuously blending three materials, such as color concentrate, scrap and new stock, in accurate proportions.

Another object of the invention is to provide a blender control for maintaining the level of the material in the extruder hopper at a desired height.

A further object of the invention is to maintain a steady flow of the solid material through the blending apparatus without the occurrence of any blocking.

Figure 2:
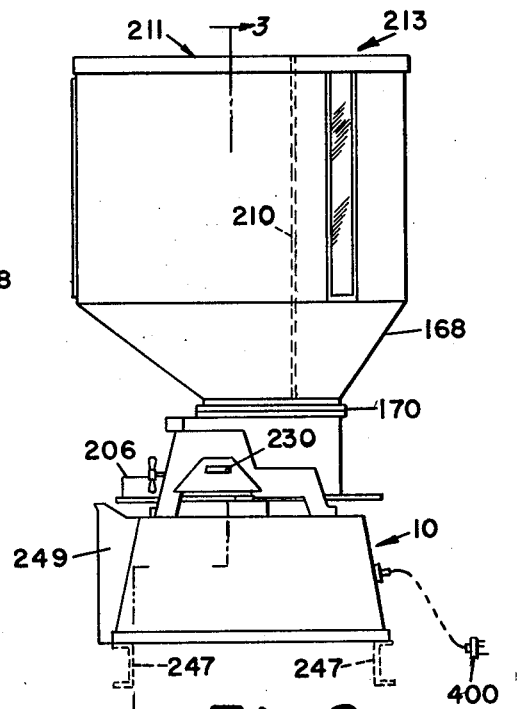
Figure 5:
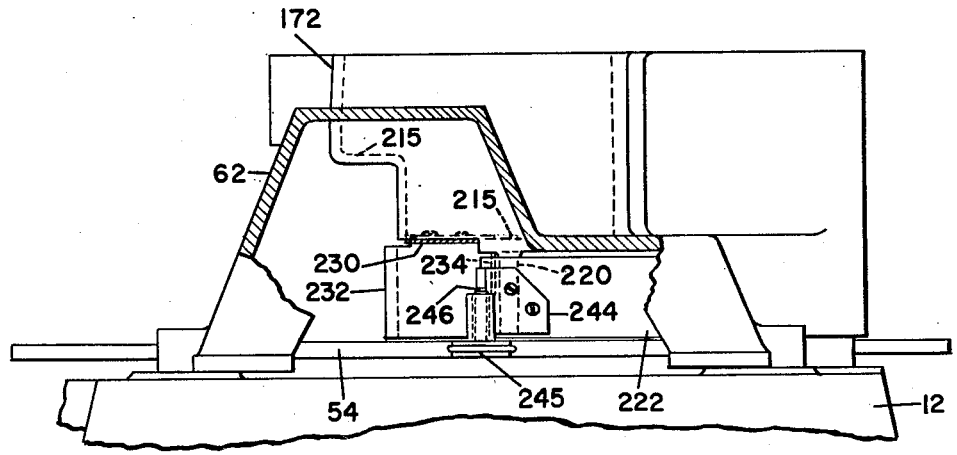
Figure 3:
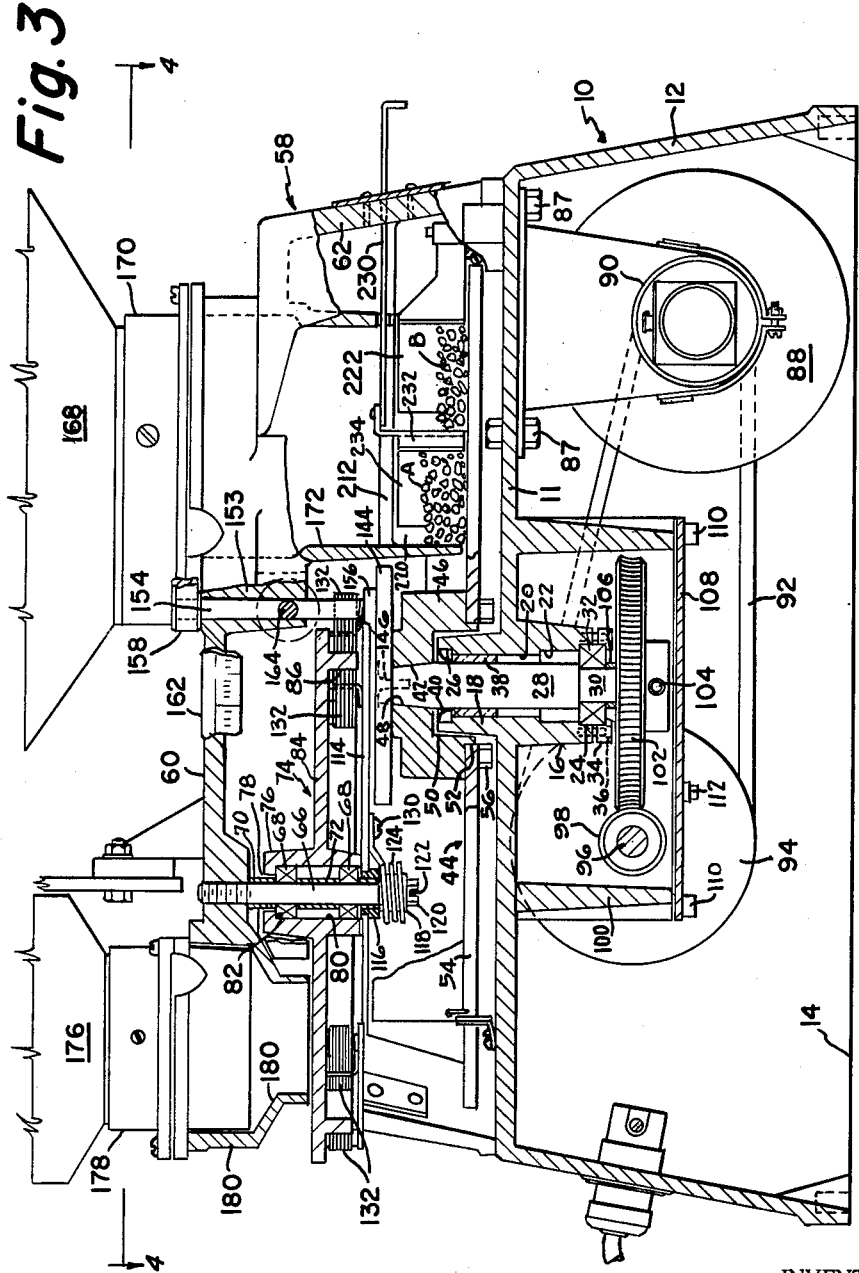
Figure 4:
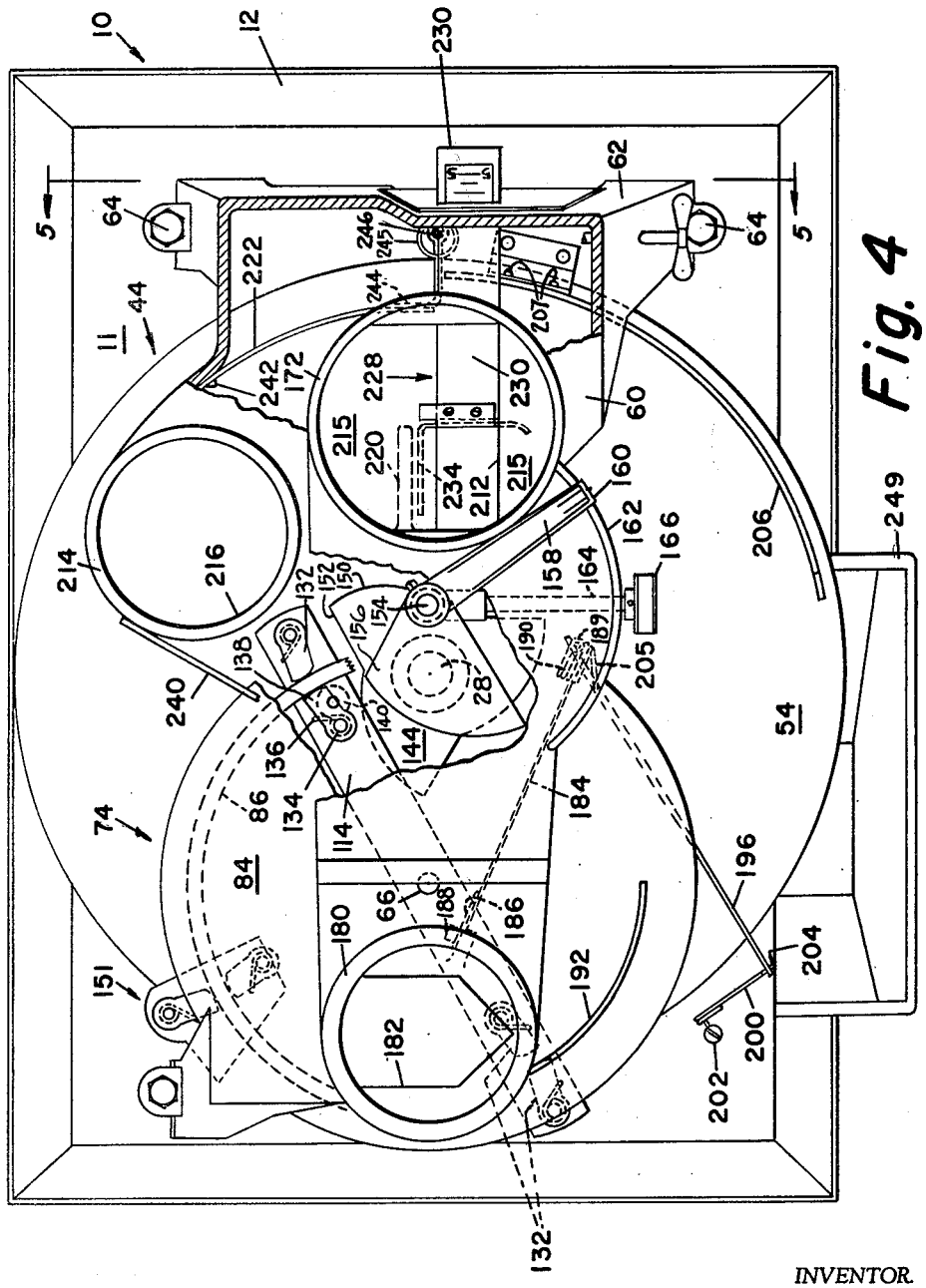
Figure 6:
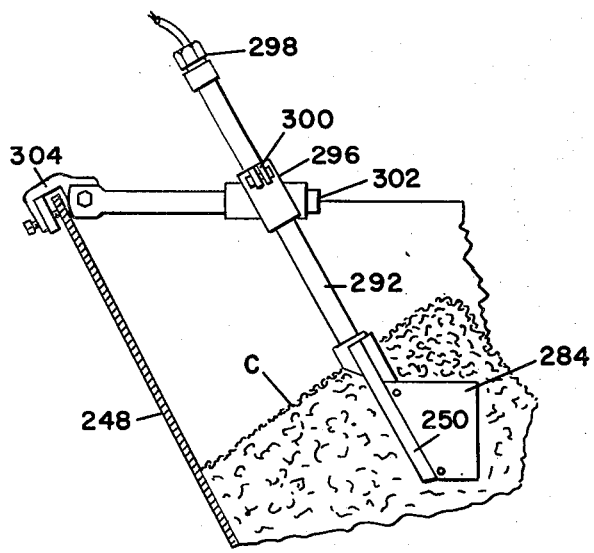
Figure 8:
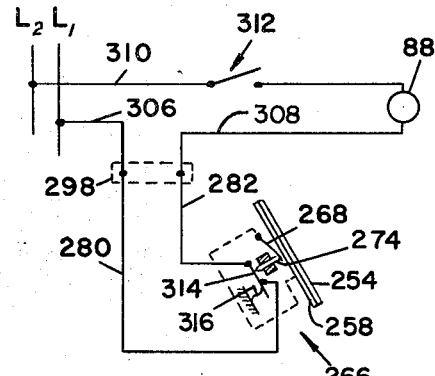
Figure 7:
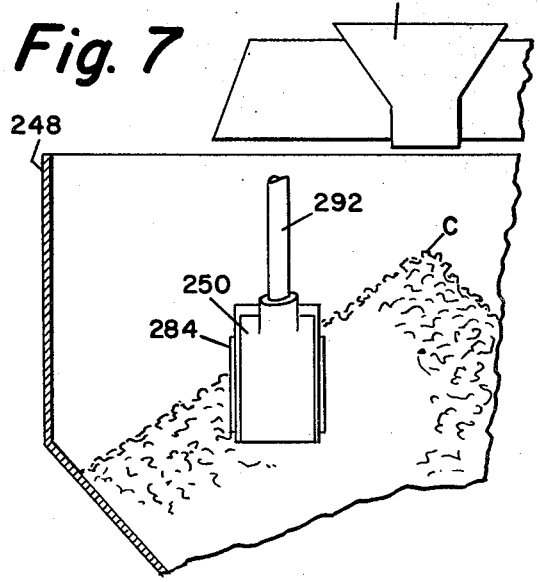
Figure 9:
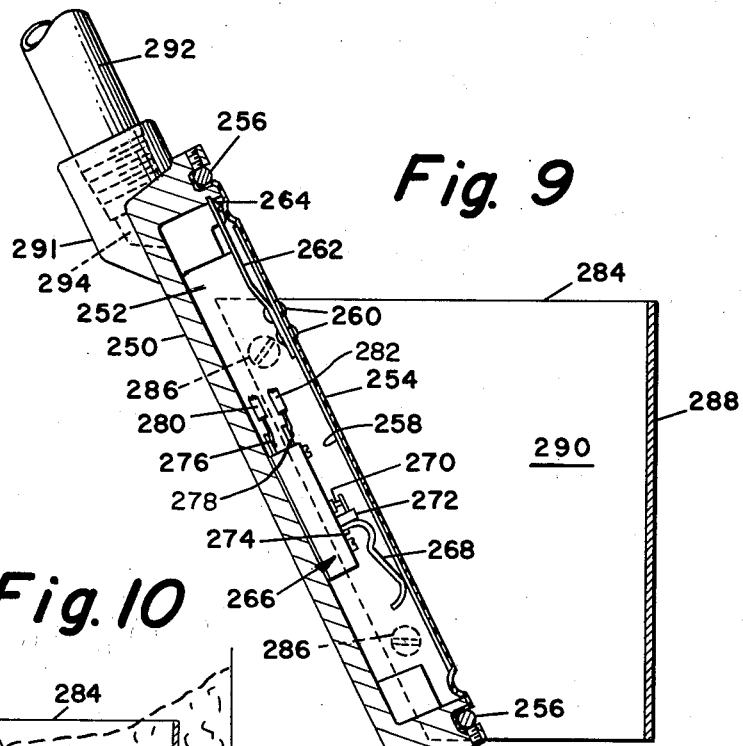
Figure 10:
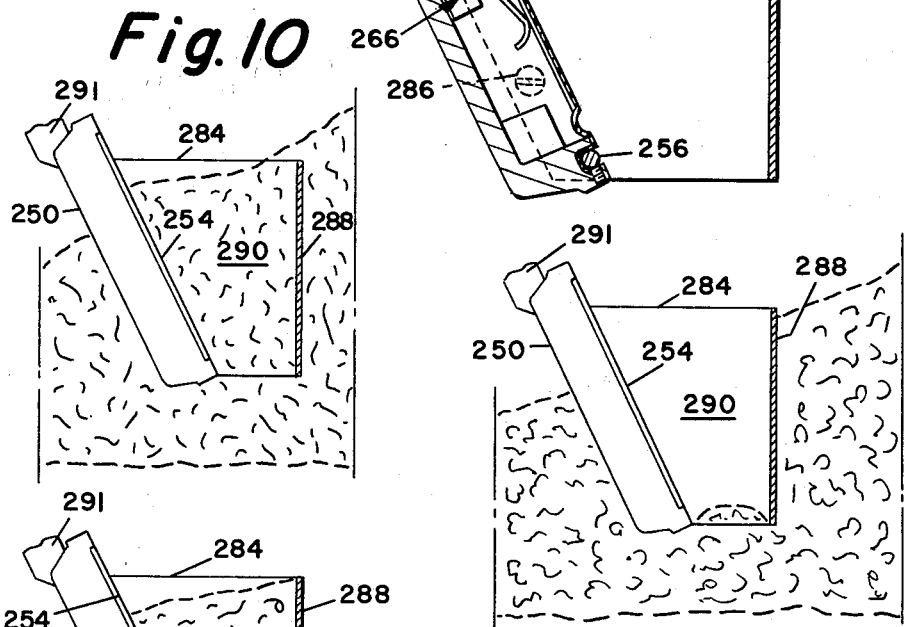
Figure 12:
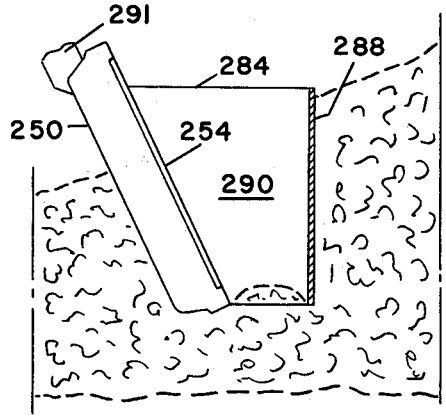
Figure 11:
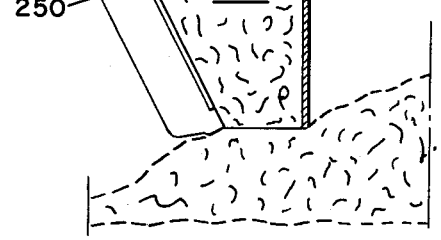
Figure 13:
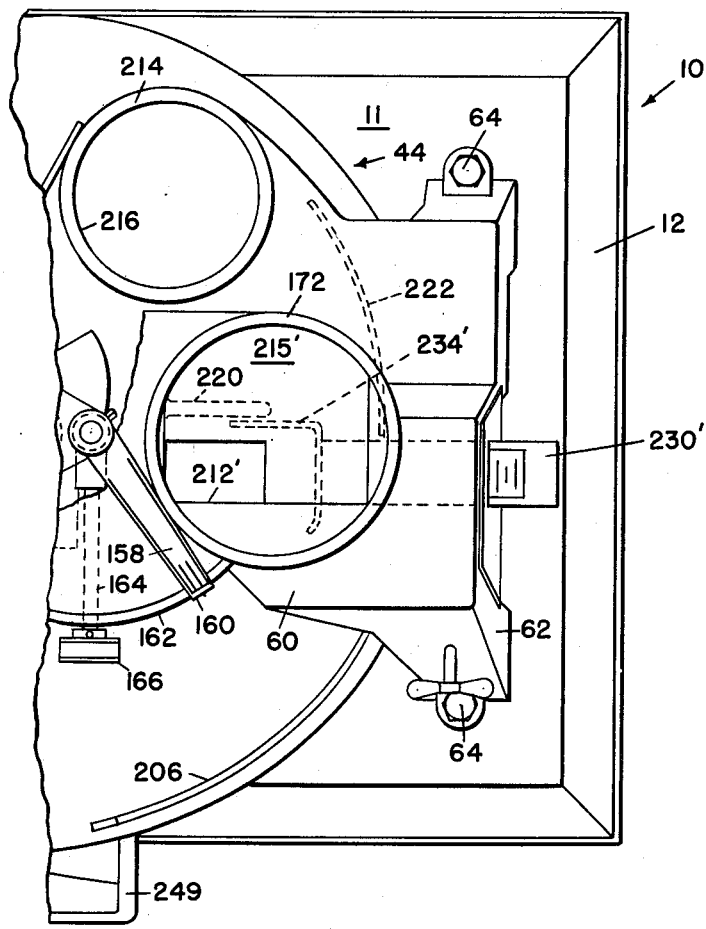

The above and other objects and features of the invention will become apparent from the following description read in conjunction with the accompanying drawings, in which:

FIGURE 1 is a front elevation of the apparatus;
FIGURE 2 is a side elevation of the apparatus shown in FIGURE 1;
FIGURE 3 is an enlarged section taken generally on the line 3—3 of FIGURE 2;
FIGURE 4 is a section taken generally on the line 4—4 of FIGURE 3;
FIGURE 5 is a section taken generally on the line 5—5 of FIGURE 4 with portions broken away to illustrate the hopper structure;
FIGURE 6 is a fragmentary view showing the extruder hopper and a portion of the level control means;
FIGURE 7 is a fragmentary view showing a portion of the level control, the extruder hopper and the blender discharge chute;
FIGURE 8 is a wiring diagram for the apparatus;
FIGURE 9 is a sectional view of a detail of the level control means;
FIGURES 10, 11 and 12 are fragmentary views illustrating sequential operating conditions of the level control apparatus; and
FIGURE 13 is a fragmentary view illustrating a modified form of new stock hopper.

An exemplary apparatus constructed in accordance with the present invention comprises a base, generally designated 10, having a horizontally extending top wall 11 surmounting upright side walls 12, the bottom of the base base being open, as at 14. Depending from a central area of the top wall 11 is a boss 16, and extending upwardly in longitudinal continuation of the latter is a boss 18. These bosses are provided with a central bore 20 having an enlarged diameter counterbore 22 and a further enlarged counterbore 24 formed in the boss 16, and an enlarged counterbore 26 formed in the boss 18. Extending freely through the bore 20 is a spindle 28 having a reduced diameter lower end portion 30 extending through ball bearing unit 32 fitted into the counterbore 24 and secured in place by a retainer ring 34 fixed to the boss 16 by studs 36. The upper end of the spindle 28 extends through a sleeve bushing 38 fitted in the bore 20 and an annular seal 40 fitted in the counterbore 26. The upper terminal portion of the spindle 32 is tapered, as at 42. Fixed to the upper end of the spindle is a stock table, generally designated 44, including a hub 46. The hub is provided with a central tapered bore 48 which receives the tapered upper terminal of the spindle, and with a counterbore 50. Extending about the undersurface of the hub is a recess 52 which receives the inner peripherally extending marginal portion of an annular plate 54 secured to the hub 46 by studs 56.

Seated upon the base 10 is a hopper support 58 having a horizontally extending top wall 60 supported upon legs 62 secured to the top wall of the base by bolts 64. Depending from the top wall 60 is a pintle 66 carrying a pair of axially spaced ball bearings 68 and sleeve spacers 70 and 72. Mounted for rotation about the pintle 66 is a color table, generally designated 74, having a hub 76 which is centrally bored, as at 78, and counterbored, as at 80. The circumferentially extending shoulder 82, between the bore and counterbore, is seated upon the outer race of the upper ball bearing unit 68. Integrally formed with the hub 76 is an annular plate 84 from which there depends a ring 86 concentric with, but lesser in diameter than, the annular plate 84.

Secured to the top wall of the base, as by bolts 87, is an electric motor 88 which mounts a pulley 90 about which is trained a V-belt 92. The latter is also trained about a pulley 94 mounted upon a shaft 96 which carries a worm 98. The shaft 96 is suitably journaled in a wall 100 depending from the top wall of the base. The worm 98 meshes with a worm wheel 102 fitted over the lower terminal portion of the spindle 28 and secured thereto by a setscrew 104. Intervening the worm wheel and the overlying inner race of the ball bearing 32 is a sleeve spacer 106. The wall 100 embraces the worm and worm wheel, and at the lower terminal end thereof is a closure plate 108 secured to the wall 100 by studs 110 and fitted with a plug 112.

Underlying the color table 74 is a flat arm 114, which arm is fitted over the lower end portion of the pintle 66 through the medium of a bushing 116. Underlying the bushing 116 is a washer 118, and underlying the latter is a nut 120 threaded on the lower terminal portion of the pintle 66. The nut is provided with a diametrically extending groove 122 which receives one end of a torsion spring 124, the other end of the torsion spring being secured to the arm 114 as by a stud 130. Each end of the arm 114 carries a pair of dogs 132 made of suitable friction inducing material, each of which is rockably mounted upon a pin 134 and biased by a torsion spring 136 in a direction for engagement of the rounded free end 138 thereof with the ring 86 depending from the plate 84. Depending from the arm 114 is a cam follower in the form of a roller 140 revolvable upon a pin, which roller is adapted for engagement with a color table advance cam 144 secured to the upper end of the spindle 28 as by a screw 146. This advance cam is provided with three identical cam sections each having a curvilinear cam surface 150 and a straight cam surface 152. A brake mechanism 151, comprising a pair of dogs similar to dogs 132 and engaging ring 86, is provided to restrict the movement of table 74 to a counterclockwise direction as viewed in FIGURE 4.

Formed integral with the top wall of the hopper support is a boss 153 through which there extends a shaft 154 mounting at the lower end thereof a stop cam 156 which is in the horizontal plane of arm 114 and is adapted to control the travel of arm 114. Extending radially outwardly from the upper terminal portion of the shaft 154 is a lever 158 having at the outer end thereof an indicator 160 overlying a scale 162. The shaft 154 is axially fixed, but may be rocked about its longitudinally extending axis and fixed in a selected position by a pin 164, the end of which pin may be brought into frictional engagement with the shaft by manipulation of a knob 166.

Mounted upon the hopper support is a stock hopper 168 having at the lower end thereof a cut-off slide gate unit 170 fitted into a pair of downspout forming portions 172 and 214 of the hopper support. Each downspout formation terminates just above the surface of the annular plate 54 except on the side thereof from which material is drawn from the hopper, on which side the spout terminates a substantial distance from the annular plate 54 to leave an opening for passage of the material. Also mounted upon the hopper support is a color hopper 176 having at the lower end thereof a cut-off slide gate 178 fitted into a downspout forming portion 180 of the hopper support. This downspout formation terminates a short distance above the annular plate 84 except for the wall thereof on the side of the downspout from which material is to be drawn, on which side the downspout terminates a substantial distance above the annular plate 84 thereby to provide an opening through which material may pass.

Extending across the plate 84 is a color scraper 184, one end portion of which is secured to the downspout formation through the medium of a spring 186 and bolt 188, and the other end portion of which is secured to a rod 189 by spring 190, the rod 189 being fixed by its upper end to the top wall of the hopper support. Extending from the downspout formation 180 is an arcuate guard 192 secured in place by bolts. Extending across the annular plate 54 is a stock scraper 196 having one end thereof secured in place by a spring 200 anchored to the hopper support by a bolt 202 and extending through the end of the scraper, as at 204. The opposite end of the scraper is secured in place by a spring 205 carried by the rod 189. Extending from the downspout formation 172 is an arcuate guard 206 secured in position by bolts 207.

The stock hopper 168 is divided by a vertical partition 210 into a large front section 211 and a small rear section 213. The front section 211 communicates with the downspout portion 172 which has a bottom opening 212 in a bottom wall 215. The rear hopper section 213 communicates with the downspout portion 214 which has a bottom opening 216. Each of the downspouts are provided with suitable valves for controlling the flow therethrough. In an injection molding process involving the reworking of scrap, new stock is stored in the front hopper section 211 and flows through the downspout 172 and opening 212 onto the plate 54 of stock table 44, and scrap or reused stock is stored in the rear hopper section 213 and flows through the downspout 214 and opening 216 onto the table 44.

A wall 220 extends vertically downwardly from the bottom of the downspout 172. This wall 220 directs the flow of scrap carried by plate 54 of table 44 toward a radially outer portion of this table at a location beyond the right end of wall 220 as viewed in FIGURE 4. The scrap is also confined by a circumferentially extending outer guard 222 mounted at one end on the housing, as by mounting screws. The other end of guard 222 extends to a location opposed to the right end of wall 220. Accordingly, the spacing between the end of wall 220 and the guard 222 is the maximum flow passageway for the scrap material.

Means are provided for varying the size of this flow passageway 228. To this end, a slide 230 extends through slots in housing wall 62 and downspout 172 and is mounted for sliding movement along a path in alignment with opening 212 which extends across the bottom of downspout 172. The slide 230 is constructed with the same width as opening 212 so that slide 230 closes off the right portion of opening 212. Thus, only the portion of opening 212 to the left of the inner end of slide 230 is open for the passage of the material in downspout 172. The inner end of slide 230 is connected to a baffle 232 by screws which engage the slide and a tab 234 of the baffle. Baffle 232 comprises a pair of perpendicular, vertically extending portions. One portion 234 is arranged to be parallel and adjacent to the partition 220. Accordingly, as the slide 230 and baffle 232 are moved outwardly, the baffle portion 234 closes off or blocks the flow passageway 228 for the scrap thereby decreasing the size of this passageway. At the same time the slide 230 exposes a greater portion of opening 212 to increase the flow through downspout 172.

With the baffle and slide arrangement in its innermost position as shown on the drawings, the flow of scrap through the passageway 228 and the flow of new stock through opening 212 are in a 50:50 proportion. Movement of the slide and baffle arrangement toward the right to decrease the size of the passageway 228 and increase the amount of opening 212 exposed to material in downspout 172 serves to increase the proportion of new stock to scrap as desired. For typical materials, the maximum relationship of new stock to scrap should be 90:10 since the particles of scrap will jam or bridge the opening when the flow of scrap is less than ten percent of the total. A guard 240 is provided upstream of downspout 214 to limit the backing up of the scrap beyond the downspout 214.

In order to illustrate the flow of new stock and scrap, there is shown a small amount of each in FIGURE 3, the new stock being designated A and the scrap being designated B. Of course, in actual operation of the apparatus, the downspout 172 is filled and the scrap extends the entire height of the flow passageway 228. As shown in this figure, the flow relationship of new stock to scrap is in a proportion of 50:50.

In order to avoid bridging of the flow passageway 228 by the stock B and to maintain flow therethrough, means are provided for oscillating the guard 222. In order that the guard 222 may be oscillated, it is preferably made of a spring material and only one end thereof is fixedly secured to the housing wall at 242. The other end of guard 222 is connected to a bracket 244 by suitable mounting screws. The bracket is mounted on a pin 246 which is mounted in an eccentric relation in wheel 245. The wheel 245 is mounted to contact the periphery of plate 54 of table 44. Accordingly, as the plate 54 rotates, the eccentric wheel 245 causes an oscillating movement of the bracket 244 and, in turn, the guard 222. By alternating bunching up and releasing the pressure against the stock B in the passageway 228, bridging particles are broken down as fast as they are formed whereby free flow is maintained.

The blending apparatus is supported by a pair of channels 247 which are mounted on the hopper 248 of an extruder or similar apparatus. As will be described more fully hereafter, the feed material is discharged from the blending apparatus through a chute 249 into the hopper 248.

Means are provided for maintaining a desired level of material in the hopper 248. This means comprises a control assembly which senses the level of the material C in hopper 248 and controls the delivery from the blending apparatus by controlling the operation of the motor 88 which drives the blending apparatus.

The control assembly is shown in deatil in FIGURE 9 and comprises a housing 250 having a rectangular cavity 252 therein. A diaphragm 254 is mounted on housing 250 by retaining rods 256 mounted in a groove surrounding cavity 252 so that diaphragh 254 serves to enclose the cavity 252 to prevent the entrance of the material which is contained in hopper 248. Diaphragm 254 is constructed of a suitable flexible material, such as Mylar, and has thickness of the order of 0.002 inch. A pressure plate 258 is attached to the inner side of diaphragm 254 by means of rivets 260 which also secure one end of a spring member 262 to the pressure plate 258, the spring member 262 being secured at its other end to a portion of the housing 250 by means of a screw 264. The pressure plate 258 serves to maintain the diaphragm 254 in a substantially flat condition. The spring means 262 serves to bias the diaphragm and pressure plate outwardly of cavity 252.

Mounted within chamber 252 is a normally closed microswitch 266 which is of any suitable type well known in the art. A spring actuating arm 268 is mounted at one end on the exterior of switch 266 and contacts the inner side of pressure plate 258 at its other end to bias the same outwardly of the cavity 252. Arm 268 is adapted to flex about the support 270 at one end thereof. Outward movement of arm 268 is limited by a stop member 272. A switch actuating plunger 274 is mounted to extend exteriorly of the switch casing for contact with the underside of switch actuating arm 268. Inward movement of plunger 274 will cause opening of the switch 266 as will be more fully described hereafter. Switch 266 is provided with a pair of terminals 276 and 278 which are connected to conductors 280 and 282, respectively. Conductors 280 and 282 are part of the control circuit for the motor 88 and are connected to opposite sides of switch 266.

Mounted on housing 250 is a U-shaped member 284 which is secured to the side walls of the cavity 252 as by screws 286. As is best shown in FIGURE 9, the base 288 of member 284 extends at an angle with the diaphragm 254. Member 284 cooperates with diaphragm 254 to define a hopper 290 which has open top and bottom ends.

Means are provided for positioning the housing 250 and the parts mounted thereon within the hopper 248. To this end, a fitting 291 is provided at the upper end of housing 250 as viewed in FIGURE 9, which fitting is internally threaded for the reception of a tubular member 292. A passageway 294 is provided in fitting 291 to provide communication between chamber 252 and the interior of the conduit 292. As shown in FIGURE 6, the tubular member 292 is adapted to be adjustably positioned in a support member 296 and terminates, at its upper end, in an electrical connector 298. Conductors 280 and 282 may thus pass from terminals 276 and 278 through passageway 294 and through the interior of tubular member 292 for connection with the connector 298. Suitable clamping means 300 are provided for permitting sliding adjustment of member 292 in support member 296 for varying the vertical position of the housing 250. Support member 296 is also slidably mounted on a horizontally extending rod 302. Rod 302 is secured to a clamping means 304 which is adapted to be clamped to the upper portion of hopper 248. Thus, by horizontally positioning the support member 296 on rod 302 and by vertically positioning tubular member 292 within support member 296, the housing 250 may be positioned at a plurality of locations within hopper 248.

Referring now to FIGURE 8, the conductor 280 is connected to one supply line $L_1$ of a source of electrical energy by a conductor 306 and conductor 282 is connected to one side of the motor 88 through a conductor 308. The other side of the motor is connected to the other supply line $L_2$ through a conductor 310. Although in FIGURE 8 conductors 310 and 306 are shown in direct connection with the supply lines, the connection is preferably by way of a typical plug means. A manually operable control switch 312 is serially connected in conductor 310. Thus, the control circuit for the motor 88 is as follows: from supply line $L_1$, through conductor 306, conductor 280, switch arm 314, conductor 282, conductor 308, motor 88, switch 312, and conductor 310 to the other supply line $L_2$.

As is shown schematically in FIGURE 8, the switch arm 314 of the microswitch 266 is biased toward contact with the fixed terminal thereof by a spring means 316. The switch plunger 274 is shown with one end contacting switch arm 314 and the other end contacting switch actuating member 268. Member 268 is shown in contact with pressure plate 258 which is actuated by the movement of diaphragm 254. It will thus be apparent that inward movement of diaphragm 254 will cause a corresponding movement of pressure plate 258, and plunger 274 to cause opening of the normally closed switch 266.

In positioning the control assembly within the hopper 248, the base 288 of member 284 should be positioned to extend approximately vertically so that the diaphragm 254 extends at an angle to the vertical. Also, the housing 250 should be positioned in spaced relation to the center line of the discharge chute 249 so that the material falling from the lower end of chute 249 into hopper 248 will not fall into the hopper 290. The hopper 290 should be positioned at the desired level within the hopper 248 for the operating condition involved. The parts of the control assembly are constructed and arranged in the operating position such that the force which is applied to the switch actuating plunger 274 with the hopper 290 empty (FIGURE 12) will not cause inward movement thereof sufficient to open the switch 266 against the bias of switch return spring 316 and such that the force applied to the switch actuating plunger with the hopper substantially filled (FIGURE 10) will be sufficient to overcome the bias of spring 316 and open the switch 266.

In the operation of the apparatus, with the switch 112 closed and the extruder discharge means continuously operable to withdraw material from hopper 248, the control assembly will be operative to maintain the level of the material in hopper 248 at a predetermined height in accordance with the position of the hopper 290. Assuming that the material in hopper 248 is at its upper level as shown in FIGURE 10, the hopper 290 will contain solid material. The weight of this solid material on diaphragm 254 will position the same in an inward position in accordance with which actuating arm 268 is moved inwardly about its pivot 270 to position the plunger 274 in a position to move switch arm 314 out of contact with the fixed contact of switch 266. This breaks the control circuit to the motor 88 whereby this motor 88 is in an inoperative condition.

As the extruder discharge apparatus continuously operates to withdraw material from the bottom of hopper 248, the level of the material in hopper 248 recedes. As this level recedes, the hopper 290 will initially retain the material which has previously entered the same. This hopper will remain in this condition until the level of the material reaches the lower edge of the hopper 290, this condition being illustrated in FIGURE 11. When the level falls below this height, the lower opening of the hopper 290 is uncovered so that the material therein will fall out through the bottom opening. When the hopper 290 is emptied, the diaphragm 254 will return to its outer position by the action of springs 268 and 262. In this outer position of diaphragm 254 the switch arm 314 is moved to the closed position by the spring 316 to thereby close the switch 266 and also close the control circuit for the motor 88.

With the motor 88 energized, it is operative to drive the blending apparatus which delivers material into hopper 248 through chute 249.

As the level of the material in hopper 248 is raised, initially none of the material will enter the hopper 290 since, because of its solid state, the material cannot flow upwardly into the hopper 290. Moreover, since the level is not high enough, no material can flow into hopper 290 through its top opening. However, when the level of the material reaches the upper end of hopper 284 material will overflow into hopper 290 to thereby fill the same, whereby the control assembly is again in the condition illustrated in FIGURE 10. In this condition, the diaphragm 254 will be moved to the above-described control position in which the switch 266 is actuated to its open position to thereby break the control circuit for motor 88 and de-energize the same.

The apparatus will continue to operate in the above-described cycle to maintain the level of material in hopper 248 in accordance with the position of the control assembly. If it is desired to change the level to be maintained in hopper 248, the control assembly may be positioned to a different level by simple adjustment of the supporting means for the housing 250.

The construction in accordance with this invention prevents frequent and unnecessary start-stop cycles by maintaining a maximum and minimum level within a range which approximates the vertical height of the base 288. Thus, during the period in which the level of the material in hopper 248 falls from the maximum level (FIGURE 10), which is that level at the upper end of hopper 290, the material within hopper 290 will maintain the motor 88 in an inoperative condition. This condition will be maintained until the level of the material in hopper 290 falls below the level illustrated in FIGURE 11 to thereby permit discharge of the material in hopper 290. When the motor is actuated to the energized condition with the material at its lower level, the motor will remain in this condition until the level of the material is increased from a point below the lower edge of base 288 to a level above the upper edge of base 288. This time delay permits the feeder to run a substantial length of time instead of just for a short period. Thus, by reason of the hopper arrangement, unnecessary starting and stopping is eliminated.

In preparation for use, as for example in a molding process in which scrap stock is used, the front section 211 of the hopper 168 is filled with uncolored, free flowing resin particles, the rear section 213 of stock hopper 168 is filled with colored scrap particles, and the color hopper 176 is filled with solid particles of a free flowing color concentrate. During operation, the material discharged from hopper 176 is delivered onto the rotating plate 84 of table 74 which moves in a counterclockwise direction as viewed in FIGURE 4 to discharge the material onto the rotating plate 54 of stock table 44. The material discharged from hopper 168 is delivered onto the rotating plate 54 of stock table 44 which moves in a clockwise direction as viewed in FIGURE 4 to discharge material received from hopper 168 and from table 74 into the chute 249 which delivers the material to the extruder hopper 248.

The blending apparatus is connected to a suitable source of supply by a typical plug arrangement 400 through which the motor 88 is energized to provide the drive for the stock tables 44 and 74. The drive for the stock table 44 is via the motor pulley 90, belt 92, pulley 94, shaft 96, worm 98, worm wheel 102 and spindle 28. The drive for the color table 74 is via the advance cam 144, roller 140, arm 114, dogs 132 and ring 86. The torsion spring 124 urges the arm 114 in a direction for engagement of the roller 140 with the curvilinear surfaces 150 of the advance cam 144. As the cam turns, the arm 114 is turned against the influence of the spring 124 and simultaneously the dogs 132 engage the ring 86 and turn the color table with the arm 114. When the advance cam has turned sufficiently so that the roller 140 leaves the curvilinear surface 150 and starts down the surface 152, the arm 114 is returned under the influence of spring 124, the dogs 132 passing freely along the ring 86 without moving the color table 74. The braking arrangement 151 prevents return movement of table 86. Thus, the color table 74 is advanced intermittently, counterclockwise as viewed in FIGURE 4, through the action of the advance cam, there being three advances for each revolution of the spindle 28.

The extent of each advance may be controlled by positionally adjusting the stop cam 156. This may be accomplished by turning the knob 166 so as to free the shaft 154, turning the lever 158 to the desired position, thereby turning the shaft 154 and the stop cam 156, and then turning the knob 166 in the opposite direction to lock the shaft 154 in position again. When the cam surface of the stop 156 does not engage the arm 114, each advance of the color table, and consequently the rate of flow of color material, is a maximum. To reduce the advance, and consequently the rate of flow of color material, the cam surface of the stop 156 is brought into engagement with the opposed narrow edge of the arm 114 to effect some lost motion between the advance cam 148 and the roller 140.

The uncolored, free flowing, resin compound stock is discharged from the hopper 168 through the valve 170 and downspout 172 onto the rotating plate 54 of stock table 44. Also, the scrap is discharged from hopper 168 through downspout 214 onto rotating plate 54 of stock table 44. As the table rotates, clockwise as viewed in FIGURE 4, it draws the material out from under the hopper 168 through the openings 212 and 216. The stock material moves on the stock table in a steady stream from the openings to the scraper 196 which directs the material into chute 249. Simultaneously, the free flowing color concentrate is discharged from the hopper 176 through the valve 178 and the downspout 180 into the rotating plate 84 of color table 74. The intermittently advanced color table draws the material from under the hopper 176 through the opening 182 and moves it along between the guard 192 and the scraper 184. Eventually, the material drops over the edge of the color table onto the stock table where it joins the steady stream of stock material and is discharged therewith over the edge of the stock table into the chute 249 from whence it drops into the underlying extruder hopper 248.

The slide and baffle arrangement is set to a position which will provide the desired proportion of new stock to scrap which will be delivered to the stock table 44. The flow of the stock A is along a generally arcuate path emanating from the opening 212 and extending to the guard 196 which then directs the material into the chute 249. The flow path of the stock B is along a generally arcuate path emanating from the flow restricting passage 228 and extending to the guard 196. The radial extent of the stock A is dependent on the size of opening 212 and the radial extent of the stock B depends upon the radial extent of the flow restricting passage 228.

The operation of the blending apparatus is controlled by the level control means which operates in the manner described previously to start and stop the motor 88 so as to maintain a desired level of material in the extruder hopper. Also, as the stock table 44 rotates, the roller 245 rotates to cause eccentric movement of pin 246 which acts through plate 244 to cause oscillating movement of the guard 222. The oscillation of guard 222 breaks down any particles which tend to bridge the flow restricting passage 228.

In the apparatus hereinbefore described, the ratio of color concentrate to new stock and scrap is at a preset value since the total amount of new stock and scrap is substantially constant. In some applications of a blending apparatus, it is desirable that the ratio of color concentrate to new stock be fixed for a particular run and that only the flow of scrap be capable of variation. For example, in many instances the scrap is already colored and does not require the addition of color during reworking. Furthermore, the flow rate of scrap must be varied in accordance with the supply thereof so that the proper amount of scrap is used per hour. At the same time, the ratio of color concentrate to new stock should be constant. The best way to accomplish this constant ratio is by the provision of a fixed size discharge opening for the new stock.

The modified form of new stock hopper arrangement is illustrated in FIGURE 13 and is designed to accomplish these results. The parts of the blending apparatus are substantially the same whereby like parts have been given the same reference numerals. The scrap flows through downspout 214 and opening 216 onto table 44 and is guided between the wall 220 and guard 222 as in the apparatus previously described. The only difference in this form of the invention is in the construction of the bottom of the new stock hopper and of the slide and baffle mechanism. The bottom wall 215' of downspout 172 has a fixed rectangular opening 212' through which the new stock flows onto the table 44. A slide and baffle mechanism is provided for varying the size of the scrap flow passageway between the end of wall 220 and guard 222. A slide 230' is provided at one end thereof with a baffle having a vertically extending wall 234' adjacent wall 220. Baffle wall 234' functions in the same manner as the baffle of the previously described form of the invention. The only difference is that the slide and baffle mechanism is mounted for movement beneath the bottom wall 215' and, accordingly, does not vary the size of opening 212'.

During operation of a blending apparatus comprising the arrangement shown in FIGURE 13, the flow of new stock is constant by reason of the fixed opening 212' whereby the ratio of color concentrate to new stock is constant. However, the flow of scrap may be varied by the slide and baffle arrangement which is movable to vary the size of the scrap flow opening as was previously described.

It will be apparent that various changes may be made in the construction and arrangement of parts without departing from the scope of the invention. Accordingly, the invention is not to be regarded as limited except as required by the following claims.

What is claimed is:

1. Apparatus for blending dry free flowing materials comprising a first hopper having a discharge opening, a first rotatable table for receiving material discharged from said first hopper, a second hopper having a discharge opening, a third hopper adjacent said second hopper and having a discharge opening, a second rotatable table receiving material discharged from said second and third hoppers, means guiding the material received on said second table from said second and third hoppers to join and form a mixture on said second hopper, means at the junction of said materials on said second table for regulating the proportion of second hopper material to third hopper material in said mixture thereof, one of said tables being positioned higher than the other, means for directing the material received on said higher table onto said lower table, and means for discharging from said lower table the material received thereby from its associated hopper means and from said higher table.

2. Apparatus for blending dry free flowing materials comprising a first hopper having a discharge opening, a first rotatable table for receiving material discharged from said first hopper, a second hopper having a discharge opening, a third hopper adjacent said second hopper and having a discharge opening, a second rotatable table receiving material discharged from said second and third hoppers whereby said materials form a mixture, one of said tables being positioned higher than the other, means for directing the material received on said higher table onto said lower table, means for discharging from said lower table the material received thereby from its associated hopper means and from said higher table, and means cooperable with the materials received on said second table for conjointly regulating the proportion of second hopper material to third hopper material in said mixture thereof.

3. Apparatus for blending dry free flowing materials comprising a first hopper having a discharge opening, a first rotatable table for receiving material discharged from said first hopper, a second hopper having a discharge opening, a third hopper adjacent said second hopper and having a discharge opening, a second rotatable table receiving material discharged from said second and third hoppers, means guiding the material received on said second table from said second and third hoppers to join and form a mixture on said second hopper, means at the junction of said materials on said second table for regulating conjointly the proportion of second hopper material to third hopper material in said mixture thereof, one of said tables being positioned higher than the other, means for directing the material received on said higher table onto said lower table, means for discharging from said lower table the material received thereby from its associated hopper means and from said higher table, means for driving said first and second tables, a fourth hopper for receiving material discharged from said lower table, and means responsive to the level of material in said fourth hopper for controlling operation of said driving means to maintain a predetermined level of material in said fourth hopper.

4. Apparatus for blending dry free flowing materials comprising a first hopper having a discharge opening, a first rotatable table for receiving material discharged from said first hopper, a second hopper having a discharge opening, a third hopper adjacent said second hopper and having a discharge opening, a second rotatable table receiving material discharged from said second and third hoppers, one of said tables being positioned higher than the other, means for directing the material received on said higher table onto said lower table, means for discharging from said lower table the material received thereby from its associated hopper means and from said higher table, means guiding the material received on said second table from said second and third hoppers to join and form a mixture on said second hopper, means at the junction of said materials on said second table for regulating the proportion of second hopper material to third hopper material in said mixture thereof, means for driving said first and second tables, a fourth hopper for receiving material discharged from said lower table, and means responsive to the level of material in said fourth hopper for controlling operation of said driving means to maintain a predetermined level of material in said fourth hopper.

5. Apparatus for blending dry free flowing materials comprising a first hopper having a discharge opening, a first rotatable table for receiving material discharged from said first hopper, a second hopper having a discharge opening, a third hopper adjacent said second hopper and having a discharge opening, a second rotatable table receiving material discharged from said second and third hoppers whereby said materials form a mixture, one of said tables being positioned higher than the other, means for directing the material received on said higher table onto said lower table, means for discharging from said lower table the material received thereby from its associated hopper means and from said higher table, and means for regulating the proportion of second hopper material to third hopper material in said mixture thereof, said regulating means comprising a first flow control means movable to intersect at least a portion of the flow path from said second hopper to said discharge means, a second flow control means to intersect at least a portion of the flow path from said third hopper to said discharge means and means interconnecting said first and second flow control means for conjoint movement thereof.

6. Apparatus for blending dry free flowing materials comprising a first hopper having a discharge opening, a first rotatable table for receiving material discharged from said first hopper, a second hopper having a discharge opening, a third hopper adjacent said second hopper and having a discharge opening, a second rotatable table receiving material discharged from said second and third hoppers, one of said tables being positioned higher than the other, means for directing the material received on said higher table onto said lower table, means for discharging from said lower table the material received thereby from its associated hopper means and from said higher table, means guiding the material received on said second table from said second and third hoppers to join and form a mixture on said second hopper, and means for conjointly regulating the proportion of second hopper material to third hopper material in said mixture thereof, said regulating means comprising a first flow control means movable to intersect at least a portion of the flow path from said second hopper to said discharge means and a second flow control means to intersect at least a portion of the flow path from said third hopper to said discharge means, said first flow control means including a member movable across said discharge opening of said second hopper.

7. Apparatus for blending dry free flowing materials comprising a first hopper having a discharge opening, a first rotatable table for receiving material discharged from said first hopper, a second hopper having a discharge opening, a third hopper adjacent said second hopper and having a discharge opening, a second rotatable table receiving material discharged from said second and third hoppers, one of said tables being positioned higher than the other, means for directing the material received on said higher table onto said lower table, means for discharging from said lower table the material received thereby from its associated hopper means and from said higher table, means guiding the material received on said second table from said second and third hoppers to join and form a mixture on said second hopper, and means for conjointly regulating the proportion of second hopper material to third hopper material in said mixture thereof, said regulating means comprising a first flow control means movable to intersect at least a portion of the flow path from said second hopper to said discharge means and a second flow control means to intersect at least a portion of the flow path from said third hopper to said discharge means, said first flow control means including a member movable across said discharge opening of said second hopper, said second flow control means including means defining a restricted passageway in the flow path from said third hopper to said discharge means and a member movable across said passageway to vary the size thereof.

8. Apparatus for blending dry free flowing materials comprising a first hopper having a discharge opening, a first rotatable table for receiving material discharged from said first hopper, a second hopper having a discharge opening, a third hopper adjacent said second hopper and having a discharge opening, a second rotatable table receiving material discharged from said second and third hoppers, one of said tables being positioned higher than the other, means for directing the material received on said higher table onto said lower table, means for discharging from said lower table the material received thereby from its associated hopper means and from said higher table, said discharge opening of said second hopper having a fixed size, means guiding the material received on said second table from said second and third hoppers to join and form a mixture on said second hopper, and means for regulating the rate of flow of said material in said third hopper to said discharge means, said regulating means including a flow control means movable to intersect the flow path on said second table from said third hopper to said discharge means.

9. Apparatus as claimed in claim 8 wherein said flow control means includes means defining a restricted passageway in the flow path on said second table from said third hopper to said discharge means and a member movable across said passageway to vary the size thereof.

10. Apparatus for blending dry free flowing materials comprising a first hopper having a discharge opening, a first rotatable table for receiving material discharged from said first hopper, a second hopper having a discharge opening, a third hopper adjacent said second hopper and having a discharge opening, a second rotatable table receiving material discharged from said second and third hoppers whereby said materials form a mixture, one of said tables being positioned higher than the other, means for directing the material received on said higher table onto said lower table, means for discharging from said lower table the material received thereby from its associated hopper means and from said higher table, and means for regulating the proportion of second hopper material to third hopper material in said mixture thereof, said regulating means comprising a first flow control means movable to intersect at least a portion of the flow path from said second hopper to said discharge means, a second flow control means to intersect at least a portion of the flow path from said third hopper to said discharge means, said first flow control means including a member movable across said discharge opening of said second hopper, said second flow control means including means defining a restricted passageway in the flow path from said third hopper to said discharge means and a member movable across said passageway to vary the size thereof, and means interconnecting said flow control members for conjoint movement thereof.

11. Apparatus as claimed in claim 10 wherein said members are arranged to increase said discharge opening of said second hopper and to decrease the size of said restricted opening in response to conjoint movement of said members in one direction.

12. Apparatus for blending dry free flowing materials comprising a first hopper having a discharge opening, a first rotatable table for receiving material discharged from said first hopper, a second hopper having a discharge opening, a third hopper adjacent said second hopper and having a discharge opening, a second rotatable table receiving material discharged from said second and third hoppers whereby said materials form a mixture, one of said tables being positioned higher than the other, means for directing the material received on said higher table onto said lower table, means for discharging from said lower table the material received thereby from its associated hopper means and from said higher table, and means for regulating the proportion of second hopper material to third hopper material in said mixture thereof, said regulating means comprising a first flow control means movable to intersect at least a portion of the flow path from said second hopper to said discharge means, a second flow control means to intersect at least a portion of the flow path from said third hopper to said discharge means, said first flow control means including a member movable across said discharge opening of said second hopper, said second flow control means including means defining a restricted passageway in the flow path from said third hopper to said discharge means and a member movable across said passageway to vary the size thereof, said means defining said restricted passageway comprising a vertically extending wall and a vertically extending, flexible guard spaced from said wall, and means for oscillating said guard toward and away from said wall during operation of the apparatus.

References Cited in the file of this patent
UNITED STATES PATENTS

| | | |
|---|---|---|
| 228,180 | Donlon | June 1, 1880 |
| 830,543 | Trump et al. | Sept. 11, 1906 |
| 1,781,097 | Bonnot | Nov. 11, 1930 |
| 2,368,672 | McNamara | Feb. 6, 1945 |
| 2,568,332 | Genovese | Sept. 18, 1951 |
| 2,638,248 | Alvord | May 12, 1953 |
| 3,005,575 | Brewer et al. | Oct. 24, 1961 |

UNITED STATES PATENT OFFICE
CERTIFICATE OF CORRECTION

Patent No. 3,141,575                                      June 21, 1964

Nathaniel Brewer

It is hereby certified that error appears in the above numbered patent requiring correction and that the said Letters Patent should read as corrected below.

Column 10, lines 6, 41 and 70, column 11, line 42 and lines 67 and 68, and column 12, line 22, for "hopper", each occurrence, read -- table --.

Signed and sealed this 21st day of December 1965.

(SEAL)
Attest:

ERNEST W. SWIDER
Attesting Officer

EDWARD J. BRENNER
Commissioner of Patents